United States Patent [19]

Langan

[11] Patent Number: 4,478,921

[45] Date of Patent: Oct. 23, 1984

[54] MANGANESE CARBONATE ADDITIVE FOR MANGANESE DIOXIDE-CONTAINING NONAQUEOUS CELLS

[75] Inventor: Richard A. Langan, Parma, Ohio

[73] Assignee: Union Carbide Corp., Danbury, Conn.

[21] Appl. No.: 536,784

[22] Filed: Sep. 28, 1983

[51] Int. Cl.$^3$ .............................................. H01M 6/16
[52] U.S. Cl. .................................... 429/194; 429/224
[58] Field of Search ............... 429/224, 194, 196, 218

[56] References Cited

U.S. PATENT DOCUMENTS 4,101,716 7/1978 Horowitz et al. ................... 429/224
4,336,315 6/1982 Eda et al. ............................. 429/194

Primary Examiner—Anthony Skapars
Attorney, Agent, or Firm—C. F. O'Brien

[57] ABSTRACT

A nonaqueous cell employing a manganese dioxide-containing solid cathode having a minor amount of manganese carbonate to improve the pulse voltage capability of the cell at low temperatures such as −10° C.

9 Claims, No Drawings

MANGANESE CARBONATE ADDITIVE FOR MANGANESE DIOXIDE-CONTAINING NONAQUEOUS CELLS

FIELD OF THE INVENTION

The invention relates to a nonaqueous cell utilizing an active metal anode, a nonaqueous electrolyte solution based on an organic solvent and a manganese dioxide-containing solid cathode containing a minor amount of manganese carbonate to improve pulse voltage capability at low temperatures such as $-10°$ C.

BACKGROUND OF THE ART

The development of high energy battery systems requires the compatibility of an electrolyte possessing desirable electrochemical properties with highly reactive anode materials, such as lithium, sodium and the like, and the efficient use of high energy density cathode materials, such as manganese dioxide. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous electrolyte systems based on organic solvents.

The term "nonaqueous electrolyte" in the prior art refers to an electrolyte which is composed of a solute, for example, a salt or a complex salt of Group I-A, Group II-A or Group III-A elements of the Periodic Table, dissolved in an appropriate nonaqueous organic solvent. Conventional solvents include propylene carbonate, ethylene carbonate or $\gamma$- (gamma)butyrolactone. The term "Periodic Table" as used herein refers to the Periodic Table of the Elements as set forth on the inside front cover of the Handbook of Chemistry and Physics, 63rd Edition, CRC Press Inc., Boca Raton, Fla. 1982-1983.

Although manganese dioxide has been mentioned as a cathode for cell applications, manganese dioxide inherently contains an unacceptable amount of water, both of the absorbed and bound (absorbed) types, which is sufficient to cause anode (lithium) corrosion along with its associated hydrogen evolution. This type of corrosion that causes gas evolution is a serious problem in sealed cells, particularly in miniature type button cells. In order to maintain battery-powered electronic devices as compact as possible, the electronic devices are usually designed with cavities to accommodate the miniature cells as their power source. The cavities are usually made so that a cell can be snugly positioned therein thus making electronic contact with appropriate terminals within the device. A major potential problem in the use of cell-powered devices of this nature is that if the gas evolution causes the cell to bulge then the cell could become wedged within the cavity. This could result in damage to the device. Also, if electrolyte leaks from the cell it could cause damage to the device. It is therefore important that the physical dimensions of the cell's housing remain constant during discharge and that the cell will not leak any electrolyte into the device being powered.

In order to reduce the water content in manganese dioxide, several processes have been developed. For example, U.S. Pat. No. 4,133,856 discloses a process for producing an $MnO_2$ electrode (cathode) for nonaqueous cells whereby the $MnO_2$ is initially heated within a range of 350° C. to 430° C. so as to substantially remove both the adsorbed and bound water and then, after being formed into an electrode with a conductive agent and binder, it is further heated in a range of 200° C. to 350° C. prior to its assembly into a cell. British Pat. No. 1,199,426 also discloses the heat treatment of $MnO_2$ in air at 250° C. to 450° C. to substantially remove its water component.

U.S. Pat. No. 4,285,122 discloses a process whereby a homogeneous mass of particulate manganese dioxide is heat-treated and then contacted with an organic solvent that substantially fills the pores of the manganese dioxide with a layer of the organic solvent which effectively decreases the affinity or propensity of the manganese dioxide for readsorbing moisture.

U.S. Pat. No. 4,379,817 discloses a process whereby the walls of the pores of manganese dioxide are coated by vapor-depositing an organic solvent thereon to reduce the manganese dioxide's affinity for adsorbing moisture when exposed to a moisture-containing environment for a fixed time period.

Although manganese dioxide with reduced water content is better suited for nonaqueous cell systems, it was noted that cells employing this type of active material had a tendency to show increased internal impedance during storage. This condition is accompanied by poor closed circuit voltage, poor high and low temperature shelf life, poor cell voltage maintenance characteristics, and poor pulse rate and discharge capabilities.

U. S. application Ser. No. 447,106, filed in the names of Violeta Zilionis Leger and William Philip Evans on Dec. 6, 1982, discloses a nonaqueous cell employing a solid cathode comprising manganese dioxide, a binder, a conductive agent and at least one compound selected from the group consisting of alkaline earth metal hydroxides such as $Mg(OH)_2$, $Ca(OH)_2$, $Ba(OH)_2$ and $Sr(OH)_2$ and alkaline earth metal carbonates, such as $MgCO_3$, $CaCO_3$, $BaCO_3$ and $SrCO_3$ to suppress or minimize the increase in the internal impedance of the cell which may occur during storage or discharge.

U.S. application Ser. No. 509,131 filed in the name of William Philip Evans on June 29, 1983, discloses a nonaqueous cell employing a manganese dioxide-containing solid cathode having a minor amount of an alkali metal or an alkaline earth metal additive such as $Li_2SiO_3$, $Li_2B_4O_7$, $Li_2MoO_4$, $Li_3PO_4$ or $Li_2WO_4$ to suppress the build-up of internal impedance in the cell during storage and discharge that may occur with electrolyte degradation.

It is an object of the present invention to provide a novel additive for a manganese dioxide-containing cathode intended for use in a nonaqueous cell that will improve the pulse voltage capability of the cell at low temperature such as $-10°$ C.

Another object of the present invention is to provide a nonaqueous cell employing among other components a manganese dioxide-containing solid cathode having a minor amount of an additive of manganese carbonate ($MnCO_3$) to improve the pulse voltage capability at $-10°$ C.

The foregoing and additional objects will become more fully apparent from the following description.

DISCLOSURE OF THE INVENTION

The invention relates to a nonaqueous cell comprising an active metal anode, a nonaqueous electrolyte solution based on at least one organic solvent and a solid cathode comprising manganese dioxide, a binder and a conductive agent; the improvement wherein the cathode contains a minor amount of manganese carbonate to improve the pulse voltage capability at low temperatures.

The manganese carbonate additive of this invention should be incorporated in the $MnO_2$-containing cathode by an amount between about 0.1 and about 5 weight percent based on the dry weight of the cathode, preferably, between about 0.5 and about 3 weight percent and more preferably about 1 to about 2 weight percent. An amount of the additive below 0.1 weight percent will be ineffective to improve the low temperature pulse voltage capability. An amount of the additive above 5 weight percent would generally provide needless excess of the additive for improving the low temperature pulse voltage capability while also decreasing the volume available for the active cathode material for given size cells. It will be appreciated that the range of the additive will also depend upon the type of manganese dioxide employed.

To suppress or minimize an increase in the internal impedance of the cell which may occur during normal storage of discharge, an additive may be included in the manganese dioxide cathode as disclosed in U.S. application Ser. No. 447,106, filed by Violeta Zillionis Leger and William Philip Evans on Dec. 6, 1982, and U.S. application Ser. No. 509,131 filed by William Philip Evans on June 29, 1983. Specifically, U.S. application Ser. No. 447,106 discloses a nonaqueous cell employing a manganese dioxide cathode which contains a minor amount of at least one compound selected from the group consisting of alkaline earth metal hydroxides such as $Mg(OH)_2$, $Ca(OH)_2$, $Ba(OH)_2$ and $Sr(OH)_2$ and alkaline earth metal carbonates, such as $MgCO_3$, $CaCO_3$, $BaCO_3$ and $SrCO_3$ to suppress or minimize the increase in the internal impedance of the cell which may occur during storage or discharge. U.S. application Ser. No. 509,131 discloses a nonaqueous cell employing a manganese dioxide cathode which contains a minor amount of an additive selected from the group consisting of the borates, silicates, molybdates, phosphates, aluminates, niobates, tantalates, titanates, vanadates, zirconates, manganates (Mn+4), cobaltates, and tungstates of alkali metals or alkaline earth metals wherein the alkali metal is selected from the group consisting of lithium, potassium, ribidium and cesium and wherein the alkaline earth metal is selected from the group consisting of magnesium, calcium, strontium, and barium to suppress or minimize the increase in the internal impedance of the cell which may occur during storage or discharge. Suitable additives disclosed in this application include lithium metasilicate ($Li_2SiO_3$), lithium tetraborate ($Li_2B_4O_7$), lithium molybdate ($Li_2MoO_4$), lithium orthophosphate ($Li_3PO_4$), lithium orthosilicate ($Li_4SiO_4$), lithium metaborate ($LiBO_2$), lithium tungstate ($Li_2WO_4$), lithium niobate, ($LiNbO_3$), lithium tantalate ($LiTaO_3$), lithium zirconate ($Li_2ZrO_3$), lithium metavanadate ($LiVO_3$), lithium titanate ($Li_2TiO_3$) and lithium aluminate ($LiAlO_2$). The preferred additives would be lithium metasilicate, lithium tetraborate, lithium orthophosphate, lithium molybdate and lithium tungstate.

The additive to the manganese dioxide-containing cathode to suppress or minimize the increase in the internal impedance of the cell which may occur during normal storage or discharge can be incorporated in the cathode by an amount between about 0.05 and about 10 weight percent based on the dry weight of the cathode, preferably, between about 0.1 and about 3 weight percent and more preferably about 1 weight percent. It will be appreciated that the range of the additive will also depend upon the type of manganese dioxide employed. Of the additives disclosed in these applications, $Ca(OH)_2$, and $Mg(OH)_2$ are the most preferred to be used along with the novel additive in accordance with this invention. The disclosures made in these two U.S. applications are incorporated herein by reference as if set out in full text. The manganese carbonate additive and any additional additive if used can be blended directly with the dry cathode mix or can be added during the aqueous processing of the wet cathode mix. The dry mix is then molded into cathode pellets using conventional techniques.

The water inherently contained in both the electrolytic and chemical types of manganese dioxide can be substantially removed by various treatments. For example, the manganese dioxide can be heated in air on an inert atmosphere at a temperature of 350° C. for about 8 hours or at a lower temperature for a longer period of time. Care should be taken to avoid heating the manganese dioxide above its decomposition temperature which is about 400° C. in air. In oxygen atmospheres, higher temperatures may be employed.

Preferably, the manganese dioxide should be heat-treated to remove its water content in the crystal lattice to below about 1 weight percent and then it can be mixed with a conductive agent such as graphite, carbon or the like and a binder such a Teflon (trademark for polytetrafluoroethylene), ethylene acrylic acid copolymer or the like to produce a solid cathode. If desired, a small amount of the electrolyte can be incorporated into the manganese dioxide mix. In addition, another active cathode material such as poly-carbon fluoride may also be added.

An added possible benefit in the removal of substantially all the water from manganese dioxide is that if small amounts of water are present in the cell's electrolyte then the manganese dioxide will adsorb the main portion of that water from the electrolyte and thereby prevent or substantially delay the reaction of the water with the anode such as lithium. In this situation, the manganese dioxide will act as an extracting agent for the water impurities in the organic solvents.

Useful highly active metal anode materials include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide. The preferred anode materials are lithium, sodium, potassium, magnesium, calcium and alloys thereof.

Useful organic solvents employed alone or mixed with one or more other solvents for use in this invention include the following classes of compounds:

Alkylene nitriles: e.g., crotonitrile
  (liquid range, −51.1° C. to 120° C.)
Trialkyl borates: e.g., trimethyl borate, $(CH_3O)_3B$
  (liquid range, −29.3° to 67° C.)
Tetraalkyl silicates: e.g., tetramethyl silicate, (CH₃O)₄Si (boiling point, 121° C.)
Nitroalkanes: e.g., nitromethane, CH₃NO₂
   (liquid range, −17° to 100.8° C.)
Alkylnitriles: e.g., acetonitrile, CH₃CN
   (liquid range, −45° to 81.6° C.)
Dialkylamides: e.g., dimethylformamide, HCON(CH₃)₂
   (liquid range, −60.48° to 149° C.)
Lactams: e.g., N-methylpyrrolidone,

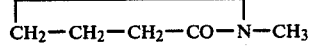
CH₂—CH₂—CH₂—CO—N—CH₃

(liquid range, −16° to 202° C.)
Tetraalkylureas: e.g., tetramethylurea, (CH₃)₂N—CO—N(CH₃)₂
   (liquid range, −1.2° to 166° C.)
Monocarboxylic acid esters: e.g., ethyl acetate
   (liquid range, −83.6° to 77.06° C.)
Orthoesters: e.g., trimethylorthoformate, HC(OCH₃)₃
   (boiling point, 103° C.)
Lactones: e.g., γ (gamma)-butyrolactone,

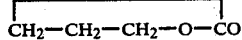
CH₂—CH₂—CH₂—O—CO (liquid range, −42° to 206° C.)
Dialkyl carbonates: e.g., dimethyl carbonate, OC(OCH₃)₂
   (liquid range, 2° to 90° C.)
Alkylene carbonates: e.g., propylene carbonate,

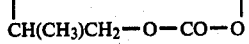
CH(CH₃)CH₂—O—CO—O (liquid range, −48° to 242° C.)
Monoethers: e.g., diethyl ether
   (liquid range, −116° to 34.5° C.)
Polyethers: e.g., 1,1- and 1,2-dimethoxyethane
   (liquid ranges, −113.2° to 64.5° C. and −58° to 83° C., respectively)
Cyclic ethers: e.g., tetrahydrofuran
   (liquid range, −65° to 67° C.); 1,3-dioxolane (liquid range, −95° to 78° C.)
Nitroaromatics: e.g., nitrobenzene
   (liquid range, 5.7° to 210° C.)
Aromatic carboxylic acid halides: e.g., benzoyl chloride
   (liquid range, 0° to 197° C.); benzoyl bromide (liquid range, −24° to 218° C.)
Aromatic sulfonic acid halides: e.g., benzene sulfonyl chloride
   (liquid range, 14.5° to 251° C.)
Aromatic phosphonic acid dihalides: e.g., benzene phosphonyl dichloride
   (boiling point, 258° C.)
Aromatic thiophosphonic acid dihalides: e.g., benzene thiophosphonyl dichloride
   (boiling point, 124° C. at 5 mm)
Cyclic sulfones: e.g., sulfolane,

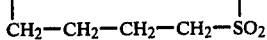
CH₂—CH₂—CH₂—CH₂—SO₂

(melting point, 22° C.); 3-methylsulfolane (melting point, −1° C.)
Alkyl sulfonic acid halides: e.g., methanesulfonyl chloride
   (boiling point, 161° C.)
Alkyl carboxylic acid halides: e.g., acetyl chloride
   (liquid range, −112° to 50.9° C.); acetyl bromide (liquid range, −96° to 76° C.); propionyl chloride (liquid range, −94° to 80° 1 C.)
Saturated heterocyclics: e.g., tetrahydrothiophene
   (liquid range, −96° to 121° C.); 3-methyl-2-oxazolidone (melting point, 15.9° C.)
Dialkyl sulfamic acid halides: e.g., dimethyl sulfamyl chloride
   (boiling point, 80° C. at 16 mm)
Alkyl halosulfonates: e.g., ethyl chlorosulfonate
   (boiling point, 151° C.)
Unsaturated heterocyclic carboxylic acid halides: e.g., 2-furoyl chloride
   (liquid range, −2° to 173° C.)
Five-membered unsaturated heterocyclics: e.g., 3,5-dimethylisoxazole
   (boiling point, 140° C.); 1-methylpyrrole (boiling point, 114° C.); 2,4-dimethylthiazole (boiling point, 144° C.); furan (liquid range, −85.65° to 31.36° C.)
Esters and/or halides of dibasic carboxylic acids: e.g., ethyl oxalyl chloride
   (boiling point, 135° C.)
Mixed alkyl sulfonic acid halides and carboxylic acid halides:
   e.g., chlorosulfonyl acetyl chloride (boiling point, 98° C. at 10 mm)
Dialkyl sulfoxides: e.g., dimethyl sulfoxide
   (liquid range, 18.4° to 189° C.)
Dialkyl sulfates: e.g., dimethylsulfate
   (liquid range, −31.75° to 188.5° C.)
Dialkyl sulfites: e.g., dimethylsulfite
   (boiling point, 126° C.)
Alkylene sulfites: e.g., ethylene glycol sulfite
   (liquid range, −11° to 173° C.)
Halogenated alkanes: e.g., methylene chloride
   (liquid range, −95° to 40° C.); 1,3-dichloropropane (liquid range, −99.5° to 120.4° C.)

The preferred solvents are sulfolane; tetrahydrofuran; methyl-substituted tetrahydrofuran; 1,3-dioxolane; 3-methyl-2-oxazolidone; propylene carbonate; γ (gamma)-butyrolactone; ethylene glycol sulfite; dimethylsulfite; dimethyl sulfoxide; and 1,1- and 1,2-dimethoxyethane. Of the preferred solvents, the best are sulfolane: 3-methyl-2-oxazolidone; propylene carbonate; 1,1- and 1,2-dimethoxyethane, and 1,3-dioxolane because they appear more chemically inert to battery components and have wide liquid ranges, and especially because they permit highly efficient utilization of the cathode materials.

Low viscosity cosolvents which can be used include tetrahydrofuran (THF), methyl-substituted tetrahydrofuran (Me-THF), dioxolane (DIOX), dimethoxyethane (DME), dimethyl isoxazole (DMI), diethyl carbonate (DEC), ethylene glycol sulfite (EGS), dioxane, dimethyl sulfite (DMS) of the like. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, for example, LiCF₃SO₃, LiBF₄ and LiClO₄, which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 266-July/December, 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, boron bromide, phosphorus pentafluoride, arsenic pentafluoride and antimony pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE 1

Several miniature cells having a nominal 20 mm diameter and nominal 1.6 mm height were constructed. Each cell contained 0.022 gram lithium as the anode; 0.36 gram of a particulate cathode mix containing $MnO_2$ in the weight percent shown in Table 1, 3 weight percent acetylene black, 3 weight percent polytetrafluoroethylene and the weight percent of the selected additive shown in Table 1, all percentages based on the dry weight of the cathode; and about 0.092 milliliters of an electrolyte consisting of about 50 volume percent propylene carbonate, 50 volume percent propylene carbonate, 50 volume percent dimethoxyethane (DME) and containing 1 M $LiCF_3SO_3$. Additional miniature cells were constructed as above except that they did not contain any additive.

The closed circuit voltages (Initial Volts, Fresh) of three cells of each type were observed 2 seconds after initiation of a 400-ohm discharge load. The average of the three cells was calculated and the results are shown in Table 1.

Three cells of each type were then discharged across a 30 K-ohm load with a superimposed 400-ohm pulse load (once per day, 3 days per week, for two seconds) at 21° C. The voltages were recorded with time to a 2.0 volt cutoff for both the background load and the pulse discharge load.

The above two tests were repeated for cells stored at 60° C. for 40 days and the data calculated (Initial Volts, Stored) are shown in Table 1.

For the above test, the average milliampere hour (mAh) outputs to 2.0 volts (background and pulse loads) for three fresh cells of each type were also calculated and are shown in Table 1. The same data for cells that were stored at 60° C. for 40 days are shown in Table 1.

TABLE 1

| Sample Cells | Additive | Wt % $MnO_2$ | Initial Volts Fresh (volt) | Initial Volts Stored (volt) | Discharge Capacity (mAh) to 2.0 V *Background Load Fresh | *Background Load Stored | **Pulse Load Fresh | **Pulse Load Stored |
|---|---|---|---|---|---|---|---|---|
| A | NONE (control) | 94 | 2.94 | 2.48 | 83 | 69 | 62 | 44 |
| B | 1% $MnCO_3$ | 93 | 2.82 | 2.13 | 75 | 67 | 64 | 33 |
| C | 1% $MnCO_3$/1% $Ca(OH)_2$ | 92 | 2.84 | 2.81 | 75 | 77 | 64 | 49 |
| D | 3% $MnCO_3$/1% $Ca(OH)_2$ | 90 | 2.90 | 2.81 | 79 | 76 | 66 | 51 |

*to 2.0 volt cutoff on 30-K ohm background load.
**to 2.0 volt cutoff on 400-ohm pulse load.

EXAMPLE 2

Several miniature cells were produced as in Example 1 with or without an additive as shown in Table 2. Fresh cells were chilled at −10° C. for 4 hours and then discharged across a 400-ohm pulse load for two seconds. The average closed circuit voltage (fresh) at 2 seconds observed for three cold cells of each type is shown in Table 2. The cells were then continuously discharged across a 30 K-ohm load at 21° C. for 11 days after which they were again chilled at −10° C. for four hours. The cold cells were then discharged across a 400-ohm pulse load for 2 seconds and the average closed circuit voltage at 2 seconds was calculated for three cells of each type. The results obtained (11 days) are shown in Table 2. The cells were then continuously discharged across a 30 K-ohm load at 21° C. for an additional 11 days after which they were again chilled at −10° C. for four hours. The cold cells were then discharged across a 400-ohm pulse load for 2 seconds and the average closed circuit voltage at 2 seconds was calculated for three cells of each type. The results obtained (22 days) are shown in Table 2.

TABLE 2

| Cell Sample | Additive | Pulse Voltage (volts) Fresh | 11 Days | 22 Days |
|---|---|---|---|---|
| E | None | 2.55 | 2.24 | 1.89 |
| F | 1% $MnCO_3$ | 2.56 | 2.31 | 2.16 |
| G | 1% $Ca(OH)_2$ | 2.46 | 2.14 | 1.92 |
| H | 1% $Ca(OH)_2$/1% $MnCO_3$ | 2.67 | 2.24 | 2.00 |
| I | 1% $Ca(OH)_2$/3% $MnCO_3$ | 2.48 | 2.20 | 1.81 |

The data observed from Examples 1 and 2 demonstrate that the additives of this invention can improve the −10° C. pulse voltage for $MnO_2$-containing cells.

The data also demonstrate that the novel additive of this invention (MnCO₃) can be used with another additive such as Ca(OH)₂, such other additive incorporated to improve the pulse voltage and capacity maintenance on storage. Thus, the combination of the novel additive of this invention along with an additional additive such as Ca(OH)₂ can be used to simultaneously improve the $-10°$ C. pulse voltage capability and the pulse voltage and capacity maintenance on storage. Accordingly, where the cells are expected to be stored for a long period of time, it would be preferable to add an additional additive, such as Ca(OH)₂, to the cathode for the reasons discussed above.

What is claimed:

1. In a nonaqueous cell comprising an active metal anode, a nonaqueous electrolyte solution comprising a solute dissolved in at least one organic solvent, and a solid cathode comprising manganese dioxide, a binder and a conductive agent; the improvement wherein the cathode contains a minor amount of manganese carbonate.

2. the nonaqueous cell of claim 1 wherein the manganese carbonate in the cathode is present in an amount between about 0.1 weight percent and about 5 weight percent based on the dry weight of the cathode.

3. The nonaqueous cell of claim 2 wherein the manganese carbonate is present in an amount between about 0.5 weight percent and about 3 weight percent based on the dry weight of the cathode.

4. The nonaqueous cell of claim 1 wherein the cathode contains a minor amount of an additive selected from the group consisting of alkaline earth metal hydroxides; alkaline earth metal carbonates; the borates, silicates, molybdates, phosphates, aluminates, niobates, tantalates, titanates, vanadates, zirconates, manganates (Mn +4), cobaltates, and tungstates of alkali metals or alkaline earth metals wherein the alkali metal is selected from the group consisting of lithium, potassium, rubidium and cesium and wherein the alkaline earth metal is selected from the group consisting of magnesium, calcium, strontium, and barium and mixtures thereof.

5. The nonaqueous cell of claim 4 wherein the additive in the cathode is present in an amount between about 0.1 weight percent and about 3 weight percent based on the dry weight of the cathode.

6. The nonaqueous cell of claim 4 wherein the additive is selected from the group consisting of lithium metasilicate, lithium tetraborate, lithium molybdate, lithium orthophosphate, lithium tungstate, Ca(OH)₂ and Mg(OH)₂.

7. The nonaqueous cell of claim 6 wherein the additive is Ca(OH)₂.

8. The nonaqueous cell of claim 7 wherein the manganese carbonate is present in an amount between about 0.5 weight percent and about 3 weight percent based on the dry weight of the cathode and the Ca(OH)₂ is present in an amount between about 0.1 weight percent and about 3 weight percent based on the dry weight of the cathode.

9. The nonaqueous cell of claim 4 wherein said active metal anode is selected from the group consisting of lithium, sodium, potassium, magnesium, calcium, aluminum and alloys thereof.

* * * * *